United States Patent
Jeon et al.

(10) Patent No.: US 8,767,276 B2
(45) Date of Patent: Jul. 1, 2014

(54) IMAGE FORMING APPARATUS AND METHOD OF COMPENSATING COLOR THEREOF

(75) Inventors: Wan-joon Jeon, Seongnam-si (KR); Hun-chul Sin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1205 days.

(21) Appl. No.: 12/533,214

(22) Filed: Jul. 31, 2009

(65) Prior Publication Data

US 2010/0110512 A1    May 6, 2010

(30) Foreign Application Priority Data

Oct. 31, 2008   (KR) .................. 10-2008-0107966

(51) Int. Cl.
*G03F 3/08*    (2006.01)
*H04N 1/60*    (2006.01)

(52) U.S. Cl.
USPC .......................................... 358/518; 358/1.9

(58) Field of Classification Search
USPC ............... 358/1.9, 3.24, 1.13, 1.15, 501, 504, 358/518, 521, 527, 530; 356/406, 421, 402; 382/162, 167
See application file for complete search history.

(56) References Cited

U.S. PATENT DOCUMENTS

| | | | |
|---|---|---|---|
| 7,477,418 B2* | 1/2009 | Tobie et al. | 358/1.9 |
| 7,561,168 B2* | 7/2009 | Newman et al. | 345/604 |
| 7,643,175 B2* | 1/2010 | Tai et al. | 358/1.9 |
| 7,961,352 B2* | 6/2011 | Kaneko et al. | 358/1.9 |
| 2002/0149785 A1* | 10/2002 | Chu et al. | 358/1.9 |
| 2003/0174184 A1* | 9/2003 | Bildstein et al. | 347/19 |
| 2007/0076260 A1* | 4/2007 | Upton | 358/3.21 |
| 2009/0219554 A1* | 9/2009 | Freyer et al. | 358/1.9 |

FOREIGN PATENT DOCUMENTS

| | | |
|---|---|---|
| JP | 2006-227877 | 8/2006 |
| JP | 2008-263579 | 10/2008 |

OTHER PUBLICATIONS

Office Action issued in Korean Application No. 10-2008-0107966 on Nov. 27, 2013.

* cited by examiner

*Primary Examiner* — Gabriel Garcia
(74) *Attorney, Agent, or Firm* — Stanzione & Kim, LLP

(57) ABSTRACT

A method of color compensation of an image forming apparatus includes measuring a density value of a pattern formed using auto color registration, determining whether to perform color compensation using the measured density value, and changing the Color Management System (CMS) preset in the image forming apparatus to a new CMS profile if color compensation is required. Accordingly, a CMS table can be updated quickly and conveniently according to the changed density information.

19 Claims, 6 Drawing Sheets

| Color | | YELLOW | MAGENTA | CYAN | BLACK |
|---|---|---|---|---|---|
| DENSITY VALUE | 100% | 1.0 + 0.20 ~ 1.0 - 0.10 | 1.4 + 0.10 ~ 1.4 - 0.30 | 1.2 + 0.30 ~ 1.2 - 0.10 | 0.8 + 0.10 ~ 0.8 - 0.10 |

FIG. 5

| | DENSITY VALUE | GRADE | CMS TABLE |
|---|---|---|---|
| CYAN | 1.1 ~ 1.5 | level 1 | $T_1$ |
| | 0.9 ~ 1.1 | level 2 | $T_2$ |
| | 0.7 ~ 0.9 | level 3 | $T_3$ |
| | 0.5 ~ 0.7 | level 4 | $T_4$ |
| | 0.3 ~ 0.5 | level 5 | $T_5$ |

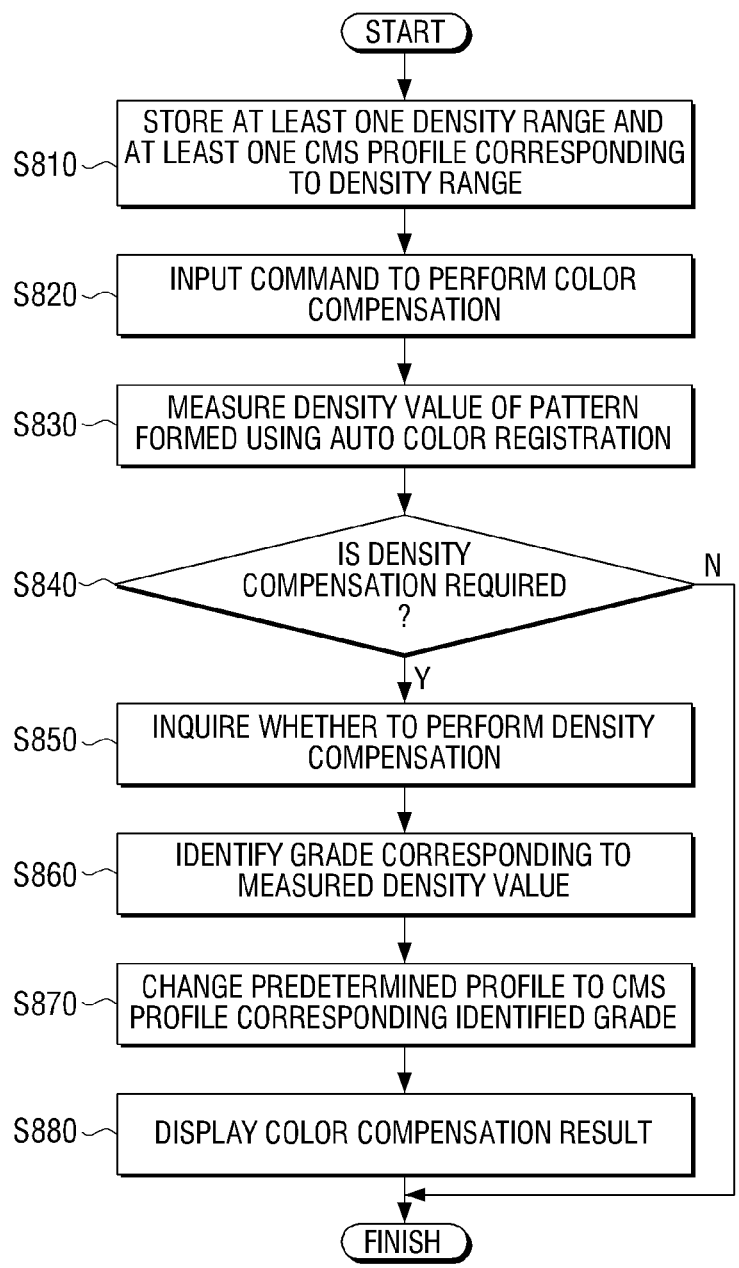

IMAGE FORMING APPARATUS AND METHOD OF COMPENSATING COLOR THEREOF

CROSS-REFERENCE TO RELATED APPLICATIONS

This application claims priority under 35 U.S.C. §119(a) from Korean Patent Application No. 2008-107966, filed on Oct. 31, 2008, in the Korean Intellectual Property Office, the contents of which are incorporated herein by reference in its entirety.

BACKGROUND

1. Field of the General Inventive Concept

The present general inventive concept relates to an image forming apparatus and a method of compensating color thereof, and more particularly relates to an image forming apparatus and a method of compensating color thereof to reset a color management system (CMS) profile by using density detection in the process of performing auto color registration.

2. Description of the Related Art

Thanks to the development of electronic technology, not only a computer but also peripheral devices such as a printer and scanner are widely distributed. In the case of printing apparatuses, a color laser printer as well as a dot printer and an inkjet printer are broadly used. The color laser printer generally uses toners of four colors, which are cyan, magenta, yellow, and black (CMYK) to express colors. In order to print an image more clearly, four photo conductors are used and printing operation is performed for each toner color.

Even if a color laser printer set is identical, image quality may differ depending various factors, such as for example the degree of deterioration of a toner or printing environment. One of the methods that can help adjust image quality efficiently is to adjust image quality by using a Color Management System (CMS) profile.

However, since an optimum CMS profile is provided in firmware form when an image forming apparatus is produced, it is difficult to reflect changed image density to the CMS profile later.

Adjusting image quality by reflecting changes in the condition of the image forming apparatus later can be inconvenient since an image density must be scanned using a scanner, the scanned image density must be measured, a CMS profile must be changed by reflecting the measurement, and the changed CMS profile must be downloaded to the image forming apparatus again. Therefore, the method of adjusting image quality by using a CMS profile cannot be applied to an image forming apparatus that does not have a scanner.

SUMMARY

The present general inventive concept provides an image forming apparatus and a method of compensating color thereof to change a CMS profile by using density detection in the process of performing auto color registration.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of color compensation of an image forming apparatus includes operations of measuring density value formed using auto color registration, determining whether to perform color compensation using the measured density value, and changing a predetermined Color Management System (CMS) in the image forming apparatus to a new CMS profile if the color compensation is required.

The method of color compensation of an image forming apparatus of claim 1 may further include the operation of storing at least one density range and at least one CMS profile corresponding to the density range.

The determining may include determining whether to perform density compensation if the measured density information is not within a predetermined range.

The CMS profile may be a profile corresponding to colors which can be supported by the image forming apparatus.

The changing may include the operations of identifying a grade corresponding to the measured density value and changing the predetermined CMS profile to a CMS profile corresponding to the identified grade.

The changing may include changing the CMS profile to decrease density if the measured density value is higher than the predetermined range and changing the CMS profile to increase density if the measured density value is lower than the predetermined range.

The method may further include operations of determining whether color compensation has been performed and inquiring whether to perform density compensation.

The method may further include the operation of receiving a command to perform color compensation.

The method may further include the operation of displaying the result of color compensation by displaying the predetermined CMS profile and changed CMS profile.

The foregoing and/or other aspects and utilities of the present general inventive concept may also be achieved by providing an image forming apparatus including a measurement unit to measure a density value of a pattern formed using auto color registration, a determination unit to determine whether to perform density compensation using the measured density value, and a control unit to change the predetermined CMS profile of the image forming apparatus to a new CMS profile if density compensation is required.

The image forming apparatus of claim 10 may further include a storage unit to store at least one density range and at least one CMS profile corresponding to the density range.

The determination unit may determine that density compensation is required if the measured density information is out of a predetermined range.

The CMS profile may be a profile corresponding colors which can be supported by the image forming apparatus.

The control unit may determine a grade corresponding to the measured density value and change the predetermined CMS profile to a CMS profile corresponding to the determined grade.

The control unit may change a CMS profile to decrease density if the measured density value is higher than the predetermined range and change a profile to increase density if the measured density value is lower than the predetermined range.

The image forming apparatus of claim may further include a UI unit to inquire whether to perform density compensation.

The image forming apparatus may further include an input unit to receive a command to perform color compensation.

The image forming apparatus of claim 10 may further include a display unit to display the result of color compensation by displaying the predetermined CMS profile and changed CMS profile.

The foregoing and/or other aspects and utilities of the present general inventive concept may also be achieved by providing a method including changing a CMS profile of an image pattern formed in the image forming apparatus based on a relationship between a measured density value of a color in the image pattern and a reference value of the color stored in the image forming apparatus.

The foregoing and/or other aspects and utilities of the present general inventive concept may also be achieved by providing a measurement unit to measure a density value of a pattern formed in the image forming apparatus, a determination unit to determine whether to perform color compensation using the measured density value, and a control unit to change a CMS profile of the pattern formed in the image forming apparatus based on a relationship between a measured density value of a color in the image pattern and a reference value of the color stored in the image forming apparatus.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 5 is a drawing illustrating an example of a predetermined density value, grade, and CMS profile pre-stored in a storage unit according to an embodiment of the present general inventive concept;

FIG. 8 is a flowchart illustrating the method of color compensation of an image forming apparatus in FIG. 7 in greater detail.

DETAILED DESCRIPTION OF THE PREFERRED EMBODIMENTS

Figure 1:
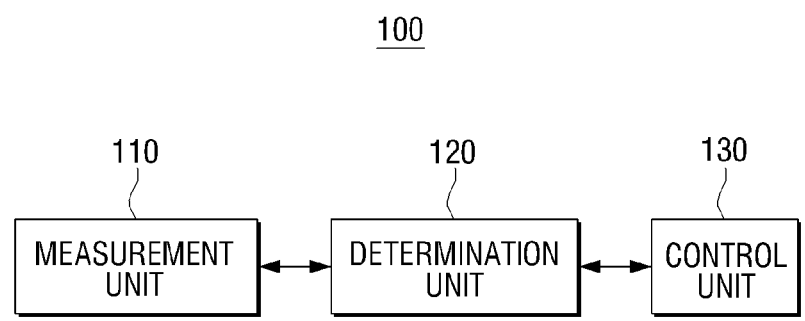
FIG. 1 is a drawing illustrating an image forming apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a drawing illustrating an image forming apparatus according to an exemplary embodiment of the present general inventive concept.

As illustrated in FIG. 1, an image forming apparatus 100 includes a measurement unit 110, a determination unit 120, and a control unit 130

The measurement unit 110 measures a density value of a pattern which is formed using an auto color registration. The density information may refer to a density value.

Auto color registration (ACR) is a method of adjusting relative locations of CMYK colors while performing a printing operation. Auto color registration may be performed when the temperature of an image forming apparatus exceeds a certain degree, or when a specific developer has been changed, or when more than a certain number of papers have been printed. Accordingly, a mode can be changed from a general printing mode to a mode to perform auto color registration.

In the process of performing auto color registration, a color registration pattern or density pattern may be output on a transfer belt. The measurement unit 110 may detect density information using the density pattern output on the transfer belt. More specifically, the measurement unit 110 may detect the density information output on the transfer belt by sensing lights reflected from the density pattern using sensors (not illustrated) including photo diodes and light-emitting diodes.

The determination unit 120 may determine whether to perform color compensation using the measured density values. If a measured density value is not within a predetermined range, the determination unit 120 can determine that density compensation is needed. The predetermined range of density compensation may be an optimum value set through various experiments and may also vary depending on a user.

If it is determined that color compensation is required, the control unit 130 can change the predetermined Color Management System (CMS) in the image forming apparatus 100 to a new CMS profile.

The CMS profile may be a three-dimensional (3D) profile which receives R, G, B and converts them to C, M, Y, K color space, a one-dimensional (1D) profile which receives C, M, Y, K and converts them to C', M', Y', K' colors, or a dither profile to perform dithering. In a preferred embodiment, the CMS profile may be a 1D profile.

The CMS profile is not limited to cyan, magenta, yellow, and black and may be a CMS profile which can convert various colors such as light cyan, light magenta, photo blue, light grey, dark grey, and photo black.

The image forming apparatus 100 according to an exemplary embodiment of the present general inventive concept may be in a tandem form capable of performing auto color registration.

Figure 2:
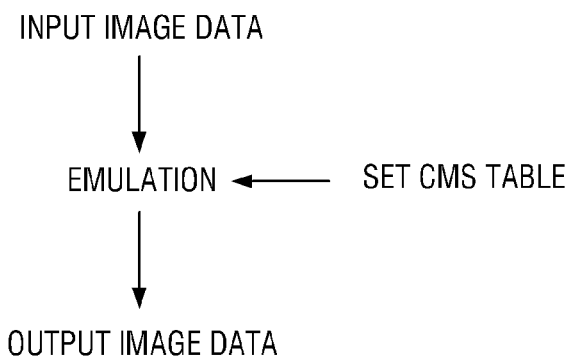
FIG. 2 is a drawing illustrating a method of performing color compensation using a CMS profile according to an embodiment of the present general inventive concept.

FIG. 2 illustrates the method of performing color compensation using a CMS profile. As illustrated in FIG. 2, in order to perform color compensation using a CMS profile, emulation is performed to convert input image data to a language that the image forming apparatus can understand. By performing color compensation through the CMS profile, a final output image data can be generated.

If one or more color developers are mismatched due to overuse by a user or mechanical defects, and if density information is changed due to deterioration of an organic photoconductor (OPC) or laser scanning unit (LSU), a CMS profile initially set in an image forming apparatus based on the environmental information may be reset. In this case, the image forming apparatus 100 according to this exemplary embodiment of the present general inventive concept may update the CMS profile quickly and conveniently according to the changes in density information.

Figures 3, 4:
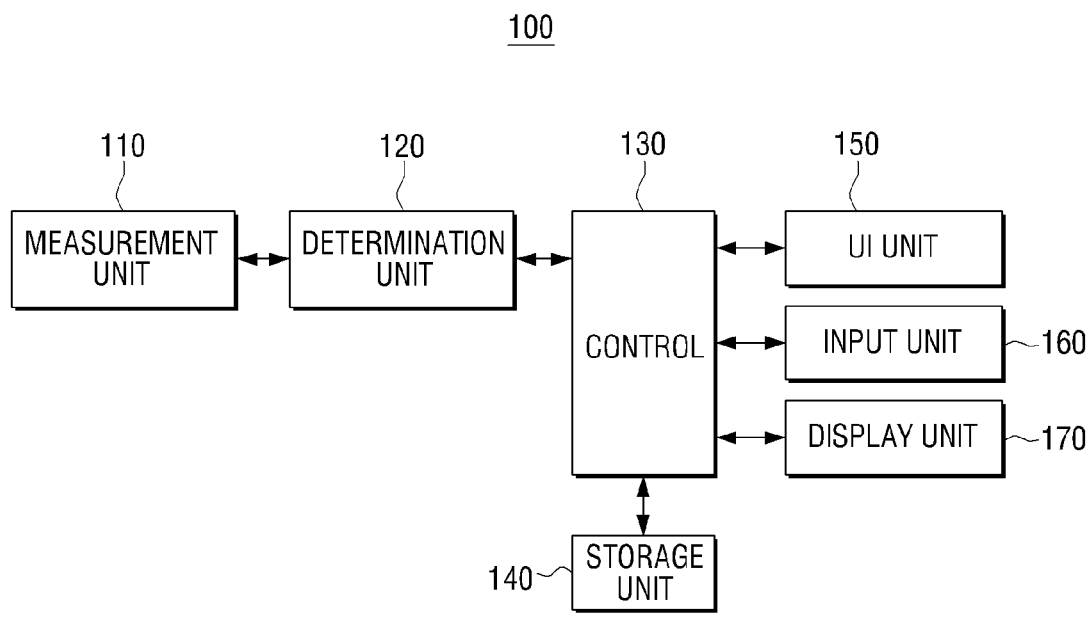
FIG. 3 is a drawing illustrating the image forming apparatus of FIG. 1 in greater detail.
FIG. 4 is a drawing illustrating an example of a predetermined density value of each developer according to an embodiment of the present general inventive concept.

FIG. 3 illustrates the image forming apparatus of FIG. 1 in greater detail. As illustrated in FIG. 3, the image forming apparatus 100 in FIG. 1 may further include a storage unit 140, a user interface (UI) unit 150, an input unit 160, and a display unit 170.

The storage unit 140 may store at least one density range for each color and at least one CMS profile corresponding to the density range. More specifically, the storage unit 140 may store density information divided into a plurality of grades and the CMS profile corresponding to the each of the plurality of grades. In addition, the storage unit 140 may be realized in various forms including a hard disk drive (HDD) or a synchronous dynamic random access memory (SDRAM).

A user may use the UI unit 150 to inquire whether to perform color compensation of one or more images. The measuring unit 110 then measures a density of the one or more images. If the determination unit 120 determines that density compensation is needed, a user, via the UI unit 150, may be informed whether to perform density compensation or not via a user interface window (not illustrated).

The input unit 160 may receive a command to perform color compensation in a variety of ways. The input unit 160 may receive a command to perform color compensation from a user and perform color compensation. Also, if the input unit 160 does not receive a command to perform color compensation from a user, color compensation may be performed through auto color registration if conditions are met as described above.

The display unit 170 may display the result of color compensation by displaying a predetermined CMS profile and a changed CMS profile. The predetermined CMS profile and the changed CMS profile may be displayed directly through a pop-up window.

The display unit 170 may also be controlled by the control unit 130 to directly print and display or preview the one or more images before and after color compensation.

Figure 6:
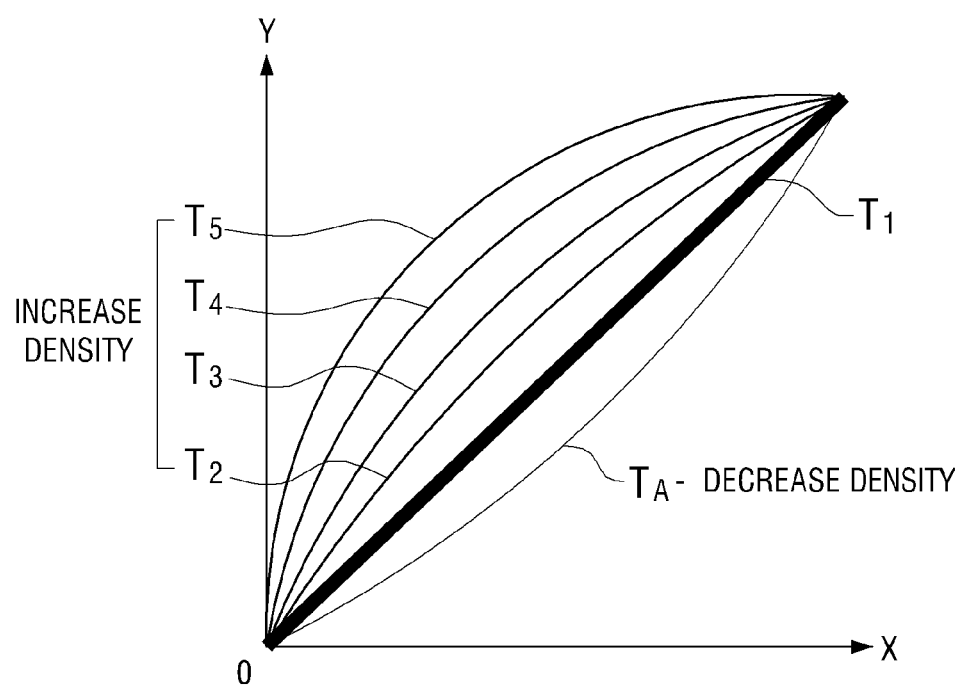
FIG. 6 is a graph illustrating various CMS profiles according to an embodiment of the present general inventive concept.

FIG. 4 illustrates predetermined density values of the developers for each color, FIG. 5 illustrates pre-stored density values, grades, and CMS profiles stored in the storage unit 140 as an example, and FIG. 6 is a graph illustrating various CMS profiles. The operational principal of an image forming apparatus according to an exemplary embodiment of the present general inventive concept will be explained in detail with reference to FIGS. 4 to 6.

FIG. 4 shows an example of density values for each C, M, Y, and K. There may be some errors for each image forming apparatus 100, but the density values illustrated in FIG. 4 may be optimum density information, or density values calculated through a number of experiments at the time of production of the image forming apparatus 100. The density values illustrated in FIG. 4 may be reference or default density values for each color.

As illustrated in FIG. 4, the 100% density color values for C, M, Y and K are different for each color. For example, the 100% density value for Yellow is relatively 1.0, with a plus error factor of 0.2 and a minus error factor of 0.1. FIG. 4 further illustrates 100% density color values for M, C and B and plus or minus ranges thereof.

FIG. 5 shows density values, grades, and CMS profiles of cyan of various colors. Though not illustrated, density values, grades and CMS profiles of magenta, yellow and black are also stored in the storage unit 140.

As illustrated in FIG. 5, if the reference density value of cyan is 1.1~1.5, its grade may be defined as level 1, and if the density value is 0.9~1.1, the grade may be defined as level 2. The density value and grade may be matched as 1:1, and be stored in the storage unit 140. Various CMS profiles such as $T_1$ and $T_2$ can also be matched and stored in the storage unit 140 based on the grade corresponding to each density value.

FIG. 5 shows an example in which a density value is decreasing based on the reference density of density value, 1.1~1.5, but the reference density value may vary depending on changes of CMS profile. Therefore, other examples in which a density value is increasing may be deduced. For instance, after the reference density of density value of 1.1~1.5 has been set, the CMS profile may be reset to $T_4$ according to the present general inventive concept, and the reference density value $T_1$ may changed to the density value of 0.5~0.7. If the CMS profile is reset based on the density value of 0.5~0.7, the density value may increase or decrease based on this density value.

A CMS profile may also be mapped to a density value directly without a grade first being mapped to the density value.

In FIG. 6, an X-axis represents densities of input colors such as C, M, Y, and K, and Y-axis represents densities of output colors such as new C, M, Y, and K. As the CMS profiles range from $T_1$ to $T_5$, the density values decrease, but the density of the images increases. In operation, if the measured density value of a color is lower than a reference density value, then the density should be increased, therefore the reference CMS profile $T_1$ may be changed to one of CMS profile $T_2$ to $T_5$, because a lower density value corresponds to an increased density. Conversely, if the density value is higher than the reference value, then the density should be decreased, and the reference CMS profile $T_1$ may be changed to CMS profile $T_4$, which is illustrated in FIG. 6 to be lower than $T_1$.

FIG. 6 is merely an example, and if the input color density X and output color density Y are divided into the range of 0 to 255, it can be expressed in an array with a 256×256 matrix. Therefore, the term of mapping profile cannot be used in this case.

If the density values, grades, and CMS profiles are pre-stored in the storage unit 140 as illustrated in FIG. 5 for instance, and if the density value measured by the measurement unit 110 is 0.8, corresponding to "level 3", the determination unit 120 determines that density compensation is required since the value is not within, but is lower than the reference value of 1.1~1.5.

If after the user is informed that density compensation is needed, the UI unit 150 receives a command to perform density compensation by a user, and the control unit 130 may determine that the grade corresponding to the measured density information is level 3. Accordingly, the predetermined $T_1$ CMS profile corresponding to level 1 may be changed to $T_3$ CMS profile corresponding to the determined level 3.

Figure 7:
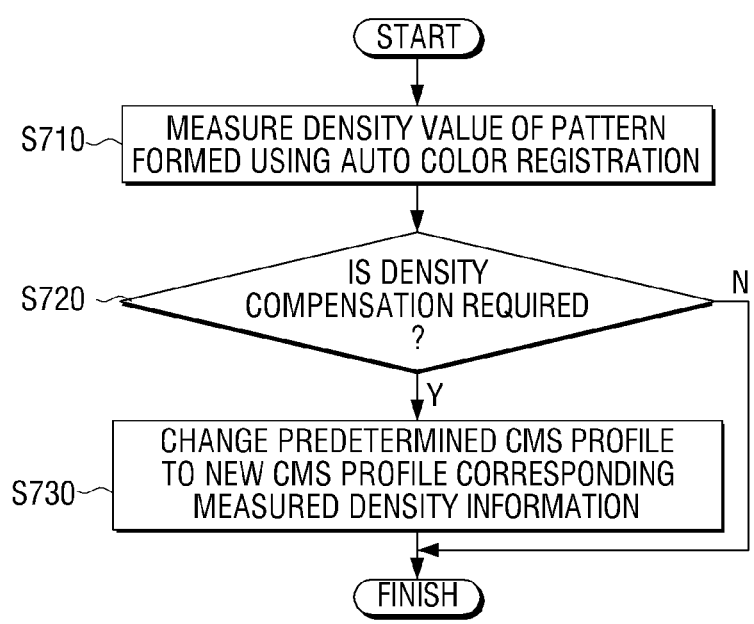
FIG. 7 is a flowchart illustrating a method of color compensation of an image forming apparatus according to an exemplary embodiment of the present general inventive concept.

FIG. 7 is a flowchart illustrating a method of color compensation of an image forming apparatus according to an exemplary embodiment of the present general inventive concept. As illustrated in FIG. 7, the method of color compensation of an image forming apparatus according to the exemplary embodiment of the present general inventive concept includes the operations in which the measurement unit 110 measures the density value of a pattern formed using auto color registration (operation S710), and the determination unit 120 determines whether to perform color compensation based on the measured density value (operation S720).

If it is determined that color compensation is required, the CMS profile predetermined in the image forming apparatus is changed to a new CMS profile (operation S730).

FIG. 8 illustrates operations used in the method of color compensation of an image forming apparatus in FIG. 7 in greater detail. As illustrated in FIG. 8, according to the method of color compensation of an image forming apparatus according to an exemplary embodiment of the present general inventive concept, the storage unit 140 can store at least one density range, at least one grade level, and at least one CMS profile corresponding to the density range (operation S810).

The input unit 160 may receive a command to perform color compensation (operation S820). As described above, the color compensation may be performed through auto color registration if conditions are met without a command control for color compensation being input.

The measurement unit 110 may measure the density value of pattern formed using auto color registration (operation S830), and the determination 120 may determine whether color compensation is required based on the measured density information (operation S840).

If it is determined that density compensation is required (operation S840Y), the UI unit 150 may inquire whether to perform density compensation (operation S850). On the other hand, if it is determined that the density compensation is not required (operation S840N), density compensation is not performed, and the program terminates.

If a command to perform density compensation is input, the control unit 130 may identify the grade corresponding to the measured density value (operation S860), and may change the predetermined CMS profile to the CMS profile corresponding to the identified grade (operation S870).

The display unit 170 may display the result of color compensation by displaying the predetermined CMS profile and changed CMS profile (operation S880).

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of color compensation of an image forming apparatus, the method comprising:
    measuring a density value of a pattern formed using auto color registration;
    determining whether to perform density compensation using the measured density value; and
    changing a predetermined Color Management System (CMS) profile in the image forming apparatus to a new CMS profile if the density compensation is required.

2. The method of color compensation of an image forming apparatus of claim 1, further comprising storing at least one density range and at least one CMS profile corresponding to the density range.

3. The method of color compensation of an image forming apparatus of claim 1, wherein the determining comprises determining that density compensation is required if the measured density is out of a predetermined range.

4. The method of color compensation of an image forming apparatus of claim 1, wherein the CMS profile is a profile corresponding to colors which can be supported by the image forming apparatus.

5. The method of color compensation of an image forming apparatus of claim 1, wherein the changing comprises identifying a grade corresponding to the measured density value and changing the predetermined CMS profile to a CMS profile corresponding to the identified grade.

6. The method of color compensation of an image forming apparatus of claim 1, wherein the changing comprises changing the CMS profile to decrease density if the measured density value is higher than the predetermined range and changing the CMS profile to increase density if the measured density value is lower than the predetermined range.

7. The method of color compensation of an image forming apparatus of claim 1, further comprising inquiring whether to perform density compensation by determining whether to perform color compensation.

8. The method of color compensation of an image forming apparatus of claim 1, further comprising receiving a command to perform color compensation.

9. The method of color compensation of an image forming apparatus of claim 1, further comprising displaying the result of color compensation by displaying the predetermined CMS profile and the changed CMS profile.

10. An image forming apparatus comprising:
    a measurement unit to measure a density value of a pattern formed using auto color registration;
    a determination unit to determine whether to perform density compensation using the measured density value; and
    a control unit to change a predetermined CMS profile of the image forming apparatus to a new CMS profile if density compensation is required.

11. The image forming apparatus of claim 10 further comprising,
    a storage unit to store at least one density range and at least one CMS profile corresponding to the density range.

12. The image forming apparatus of claim 10, wherein the determination unit determines that density compensation is required if the measured density information is out of a predetermined range.

13. The image forming apparatus of claim 10, wherein the CMS profile is a profile corresponding colors which can be supported by the image forming apparatus.

14. The image forming apparatus of claim 10, wherein the control unit identifies a grade corresponding to the measured density value and changes the predetermined CMS profile to a CMS profile corresponding to the identified grade.

15. The image forming apparatus of claim 10, wherein the control unit changes a CMS profile to decrease density if the measured density value is higher than the predetermined range and changes a CMS profile to increase density if the measured density value is lower than the predetermined range.

16. The image forming apparatus of claim 10, further comprising,
    a UI unit to inquire whether to perform density compensation.

17. The image forming apparatus of claim 10, further comprising,
    an input unit to receive a command to perform color compensation.

18. The image forming apparatus of claim 10, further comprising,
    a display unit to display the result of color compensation by displaying the predetermined CMS profile and the changed CMS profile.

19. An image forming apparatus, comprising:
    a measurement unit to measure a density value of a pattern formed in the image forming apparatus;
    a determination unit to determine whether to perform color compensation using the measured density value; and
    a control unit to change a CMS profile of the pattern formed in the image forming apparatus based on a relationship between the measured density value of a color in the image pattern and a reference value of the color stored in the image forming apparatus.

* * * * *